United States Patent [19]

Ogawa et al.

[11] 4,191,101
[45] Mar. 4, 1980

[54] APPARATUS FOR PREPARING A CUP OF HOT DRINK

[75] Inventors: Akira Ogawa, Mishima; Toyoaki Masuda; Osamu Miura, both of Numazu, all of Japan

[73] Assignee: Toshiba Kikai Kabushiki Kaisha, Tokyo, Japan

[21] Appl. No.: 971,075

[22] Filed: Dec. 19, 1978

[30] Foreign Application Priority Data

Dec. 21, 1977 [JP] Japan .................................. 52-154104
Dec. 27, 1977 [JP] Japan .................................. 52-160823
Mar. 15, 1978 [JP] Japan .............................. 53-33101[U]

[51] Int. Cl.² .................................................. B01F 3/12
[52] U.S. Cl. ............................... 99/323.3; 99/289 R; 141/100; 222/447
[58] Field of Search ................ 99/280, 275, 282, 283, 99/281, 289 R, 289 P, 289 T, 289 D, 323.1, 323.2, 323.3; 141/9, 100; 222/447, 450

[56] References Cited

U.S. PATENT DOCUMENTS

| | | | |
|---|---|---|---|
| 2,712,887 | 7/1955 | King | 99/275 |
| 2,802,599 | 8/1957 | Callahan | 99/289 |
| 2,812,879 | 11/1957 | Arnett | 99/283 |
| 3,126,812 | 3/1964 | Nau | 99/283 |
| 3,379,117 | 4/1968 | Richeson | 99/289 |
| 3,446,137 | 5/1969 | Pryor | 99/289 |
| 3,518,933 | 7/1970 | Weber | 99/283 |
| 3,530,787 | 9/1970 | Litterio | 99/289 |
| 3,777,652 | 12/1973 | Engel | 99/275 |
| 4,143,589 | 3/1979 | Weber | 99/283 |

*Primary Examiner*—Robert W. Jenkins
*Attorney, Agent, or Firm*—Koda and Androlia

[57] ABSTRACT

Apparatus for preparing a cup of hot drink includes a hot water supply device and a powder supply device. The hot water supply device comprises a tank for storing the hot water, a member for controlling the temperature of the hot water in the tank, valve means for controlling the pressure of the hot water, a pipe for feeding the hot water and valve means for controlling the amount of the hot water to be fed. The powder supply device comprises a hopper filled with the powder, a powder measuring device connected to the bottom of the hopper, a chute connected to the bottom of the powder measuring device, and a table on which a cup is placed so that the hot water is poured eccentrically from the center of the cup. The powder measuring device comprises a two-stage shutter mechanism.

6 Claims, 10 Drawing Figures

APPARATUS FOR PREPARING A CUP OF HOT DRINK

BACKGROUND OF THE INVENTION

This invention relates to apparatus for preparing a cup of hot drink such as juice or soup by uniformly mixing a powder with hot water.

FIG. 1 shows a conventional hot drink preparing apparatus, in which a water supply pipe 6 is connected at its one end to a water source such as a city water source through an electromagnetic valve 5 and at the other end to the bottom of a water tank 1. A heater 4 for heating water is disposed in the lower portion of the tank 1, and a heat sensing member 3a of a thermostat 3 is disposed above the heater 4. A float 8 is disposed on the water surface in the tank 1. The float 8 is connected to a micro-switch 7 arranged on the exterior of the tank and the switch 7 is connected to the electromagnetic valve 5 to control the switch so as to constantly maintain the water level in the tank 1. A hot water feeding pipe 9 is connected to the upper portion of the tank and the free end of the pipe 9 is directed to a receptacle 16 through an electromagnetic valve 10 for adjusting the amount of the hot water to be poured into the receptacle 16.

A measuring device 14 for measuring a powder is attached to the bottom of a hopper 13 filled with the powder to be mixed with the hot water. A chute 15 is connected to the measuring device 14 and the front end opening of the chute 15 is directed toward the receptacle 16. A mixer 18 provided with stirring wings 19 driven by a motor 17 is connected to the bottom of the receptacle and a pipe 20 is connected to the bottom of the mixer 18 and extends downwardly towards the opening of a cup 21 disposed below the mixer 18.

Heretobefore, a cup of hot drink has been prepared by using the apparatus described above in the following manner.

Water supplied to the tank 1 from the water source through the pipe 6 is adjusted by the float 8 so as to maintain a constant water level. The water in the tank 1 is heated by the heater 4 and the temperature of the heated water is controlled by the thermostat 3. A predetermined amount of the powder 12 is measured by the powder measuring device 14 and fed into the receptacle 16. When the powder 12 is fed, the electromagnetic valve 10 is opened for a predetermined time to pour the hot water in the tank 1 into the receptacle 16 through the pipe 11. The powder 12 and the hot water in the receptacle 16 is then fed to the mixer 18 and stirred by the stirring wings 19 so as to completely dissolve the powder into the hot water, and thereafter, the mixed hot drink is poured into the cup 21 through the pipe 20.

However, in the conventional hot drink preparing apparatus, the hot water, the powder or the hot drink contact the receptacle, the mixer or the pipe 20, so that if the apparatus has not been used for a certain interval, the quality or taste of the powder or the hot drink adhered to the inside surfaces of these members may be changed and bacteria are likely to be grown, thus not only becoming insanitary but also damaging the taste of the hot drink to be prepared next. Furthermore, the hot drink adhered to the inside surfaces of these members drops from the front end of the pipe 20 after pouring the hot drink and closing the electromagnetic valve 10. It may be called "after-dribble" which will contaminates the outlet opening of the pipe 20.

There has been proposed another apparatus, for eliminating the defects mentioned above, in which the receptacle 16 is provided with a pipe for supplying a small amount of water to the pipe 20 to clean the inside surface thereof every time when the hot drink is poured into the cup 21. However, in such apparatus, it is not always possible to completely clean the pipe 20 so that it will be gradually contaminated during the use over a long time, and the "after-dribble" cannot be avoided. Furthermore, since one cleaning process is added every time when one cup of hot drink is prepared, not only additonal time is required to pour the next hot drink, but also the apparatus is complicated, so that it takes much time and cost to periodically disassemble and clean the apparatus.

Additionally, in the conventional apparatus, although the water level in the tank 1 is controlled by the float 8, even if the water level is preset to the predetermined level when water is supplied into the tank 1, the level will be raised when the water is heated and expanded. Therefore, in a case where the water level is closely related to the time when the electromagnetic valve 10 is opened, it is impossible to pour always a predetermined amount of hot water and to obtain a cup of hot drink with desired consistency, thus damaging the taste of the hot drink.

Furthermore, since the hot drink is poured through the receptacle 16, the mixer 18, and the pipe 20, the temperature of the hot water fed from the pipe 11 may considerably lower before it is poured into the cup, or change every time when the hot drink is poured because these members are gradually wormed by passing the hot drink.

The powder 12 in the hopper 13 is fed into the receptacle 16 after measuring the amount of powder necessary for preparing one cup of hot drink by the measuring device 14. Conventionally, as the measuring device, there was used, for example, a turn-table type measuring device provided with a plurality of measuring cups. However, in the use of such a device, it was considerably difficult to accurately measure the predetermined amount of the powder and the device itself was more complicated. In order to eliminate such defects, there has been proposed a measuring device having a two-stage shutter mechanism which is compact and has good measuring accuracy in comparison with the former type measuring device.

One typical example of the measuring device of this type is shown in FIG. 4, which comprises a measuring cylinder 43 having a predetermined inside volume and connected to the bottom of the hopper 13, upper and lower shutters 44 and 45 arranged respectively to close and open the upper and lower end openings of the measuring cylinder 43, and a mechanism for horizontally driving these shutters. A chute 15 is connected to the lower end opening of the cylinder 43.

As shown in FIG. 4, the upper and lower shutters 44 and 45 are provided with openings 44a and 45a, respectively, each having a diameter D which is substantially equal to that of the upper or lower end opening of the cylinder 43, and one ends of these shutters are connected together by a connecting portion. A female screw 48 is fixed to this connecting portion and the female screw 48 engages a feed screw 47 which is driven by a reversible motor 49. This shutter mechanism operates to alternately open and close the upper and lower shutters in the following manner. In a first stage, the lower shutter 45 is positioned to close the lower end opening of the measuring cylinder 43 and the opening 44a of the upper shutter 44 is alined with the upper end opening of the cylinder. In this state, the powder 12 fills the measuring cylinder 43. Then, the motor 49 operates to rotate the feed screw 47 to leftwardly move the shutters 44 and 45 by the distance D, thus closing the upper end opening of the cylinder 43, while closing the lower end opening thereof. After measuring the powder contained within the cylinder, the motor further moves to leftwardly the shutters by the distance D so that the opening 45a of the lower shutter 45 will be alined with the lower end opening of the cylinder 43, while the upper end opening thereof is closed. Thus, the predetermined amount of the powder in the cylinder is discharged to the chute 14. After the predetermined amount of the powder has been discharged, the motor 49 is reversely rotated to return the shutters 44 and 45 to the original position shown in FIG. 4, and the measuring cylinder 43 is again filled with the powder 12.

However, in this conventional shutter mechanism, each shutter 45 and 45 must be moved at least by the distance 2D, so that it is required for the shutter to have a length larger than the length 3D. Therefore, a large-size measuring device 14 is needed and the apparatus itself occupies a considerably large space. Furthermore, since the shutters are moved over a distance larger than 2D, it has a considerably large area which contacts directly the powder, so that the powder 12 may enter into the shutter mechanism during the sliding movement of the shutters, and the sliding resistance of the shutters will be increased. In another respect, it is difficult to increase the moving speed of the shutters where a feed-screw type shutter driving mechanism is used and there is a fear that the powder adheres to the feed screw 48 to disturb the smooth engagement of the feed screw 48 with the female screw 47. Although the motor 49 and the feed screw mechanism may be substituted by a pneumatic cylinder-piston assembly or a hydraulic cylinder-piston assembly to easily and speedily drive the shutter mechanism, and extra driving source is needed therefor. Furthermore, in a case where the upper and lower shutters are constructed so as to be independently driven, two separate driving sources are required and a mechanism for controlling the timing for driving the shutters is also required.

SUMMARY OF THE INVENTION

Accordingly, a main object of this invention is to obviate the defects of the prior art described above and to provide improved apparatus for preparing a comfortable and sanitary cup of hot drink.

Another object of this invention is to provide hot drink preparing apparatus provided with means for constantly controlling the temperature and the pressure of the hot water in the tank.

Further object of this invention is to provide an improved powder measuring device comprising a two-stage shutter mechanism which is driven by one driving source.

According to this invention, there is provided apparatus for preparing a cup of hot drink comprising a tank for storing a hot water, the tank being provided with a member for constantly controlling a temperature of the hot water and a member for adjusting a pressure of the hot water in the tank, a pipe having one end communicated with the tank for feeding the hot water from the tank, a nozzle connected to the pipe through a valve which is controlled by a timer, a hopper filled with the powder, a powder measuring device connected to the bottom of the hopper, a chute connected to the bottom of the powder measuring device and a table on which a cup is placed so that the hot water is poured eccentrically from the center of the cup.

In the other aspect of this invention, the powder measuring device comprises a two-stage shutter mechanism which comprises a powder measuring cylinder, upper and lower shutters each provided with an opening for alternately closing and opening the upper and lower end of the cylinder, and a reversibly rotatable link mechanism for driving the shutters through link members each pivotably connected at one end to the shutter and at the other end to a point on the periphery of the link mechanism.

DESCRIPTION OF THE PREFERRED EMBODIMENTS

Figure 2:
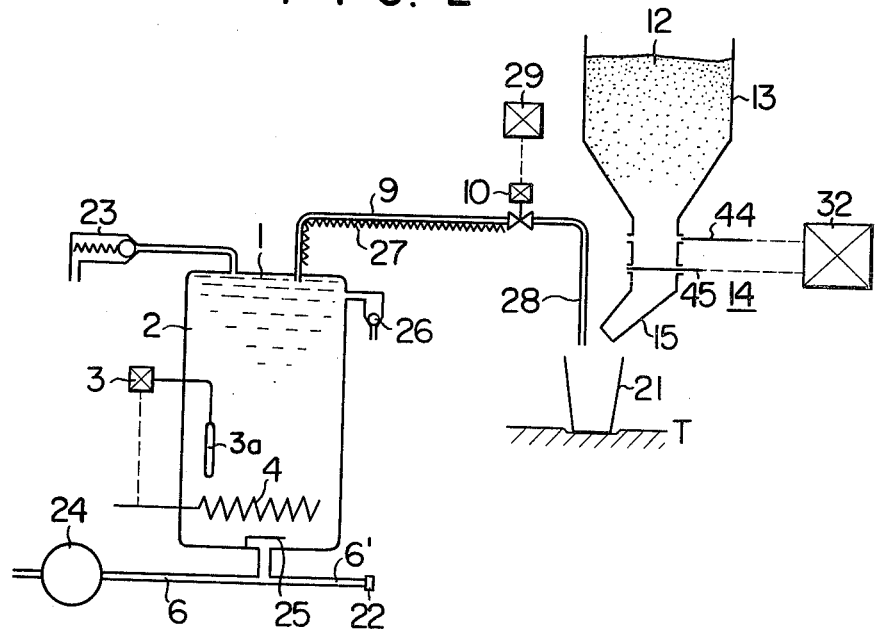
FIG. 2 is a schematic view showing one embodiment of apparatus for preparing a cup of hot drink according to this invention.

FIG. 2 shows the apparatus for preparing a cup of confortable hot drink according to this invention. In the apparatus, a water supplying pipe 6 connected to a water supply source, not shown, through a pressure adjusting device 24 is communicated with the bottom of a tank 1 for storing the water, and a baffle board 25 is attached to the bottom of the tank to cover the inlet opening of the pipe 6 with a predetermined spacing. A relief valve 23 is attached to one side of the top end of the tank 1 and a pipe 9 for feeding hot water is connected to the tank on the other side thereof. One end of the pipe 9 slightly extends into the tank 1 and the other end is connected to a nozzle pipe 28 for pouring hot water into the cup 21 through an electromagnetic valve 10. The valve 10 controls the amount of the hot water to be poured and is controlled by a timer 29. The outlet opening of the nozzle pipe 28 is provided with a plurality of small holes. A heater 27 is wound around the pipe 9.

Within the tank 1, a heater 4 for heating water is disposed near the baffle board 25 and a heat sensing member 3a connected to a thermostat 3 is located above the heater 4 to control and constantly maintain the temperature of the hot water. A valve 26 for adjusting the pressure in the tank 1 is attached to the upper portion of one side thereof. A branch pipe 6' is connected to the pipe 6 and the free end of the pipe 6' is provided with a drain cock 22.

A powder measuring device 14 is connected to the bottom opening of a hopper 13 filled with the powder 12. This device 14 comprises a specific shutter mechanism described in detail hereinafter. A chute 15 is connected to the lower end of the device 14 and the lower end opening of the chute 15 is positioned near the opening end of the nozzle pipe 28. A cup 21 is placed at a predetermined position on the table T below the nozzle pipe 28 and the chute 15.

A cup of hot drink is prepared in the following manner by using the apparatus described above.

Water flows into the tank 1 from the external water source after its pressure has been reduced by the pressure adjusting device 24 to a pressure slightly higher than that of atmosphere and the direction of flow of the water fed in the tank changes horizontally after it collides against the baffer board 25. The electromagnetic valve 10 is opened to release air in the tank when the water flows into the tank and closed when the water level reaches the opening end of the pipe 9. There exists some air space between the water surface and the top wall of the tank 1 for permitting the expansion of the hot water when it is heated. The water is heated to a predetermined temperature by the heater and expands thereby increasing the air pressure in the tank 1. The operating point of the relief valve 23 to start the relief of the inner pressure of the tank is preset to a pressure slightly higher than that set by the pressure adjusting device 24, so that when the inner pressure of the tank reaches the predetermined pressure, the air in the tank 1 is exhausted through the relief valve 23 and the tank is completely filled with hot water, thus preventing the abnormal increase of the inner pressure of the tank. The temperature of the hot water in the tank is always maintained constantly by controlling the electric current flowing through the heater 4 by the thermostat 3.

A predetermined amount of the powder 12 measured by the powder measuring device 14 is fed to the cup 21 through the chute 15 by alternately closing and opening the upper and lower shutters 44 and 45, which are driven by a driving mechanism 32. The hot water in the tank 1 is poured into the cup through the nozzle 28 by opening the valve 10 at the time preset by the timer 29 under the pressure preset by the pressure adjusting device 24 which is higher than that of atmosphere and the powder 12 is fed into the cup 21 slightly after the starting of the pouring of the hot water, thus preparing a cup of hot drink.

Figure 1:
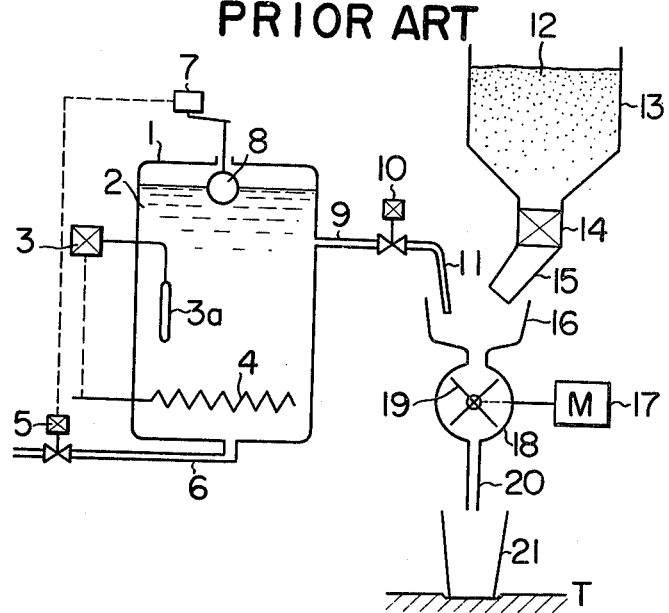
FIG. 1 is a schematic view showing conventional apparatus for preparing a cup of hot drink.

As is apparent from the foregoing descriptions, since the powder is mixed with and dissolved into the hot water only in the cup 21, the hot drink contacts only the cup and does not contact any other members such as a receptacle 16 or a mixer 18 as in the conventional apparatus shown in FIG. 1, so that the quality of the hot drink never changes and the bacteria do not grow in members other than the cup. Therefore, a fresh and sanitary hot drink having good quality can always be obtained.

The provision of the heater 27 around the pipe 9 makes it possible to keep always constant the temperature of the pipe 9, i.e. that of the hot water therein, so that the temperature of the hot water is not substantially lowered in the course from the tank 1 to the cup 21, and a cup of hot drink having a constant temperature can be prepared at any time even if the apparatus is not continuously used. Further, although hot water supplying means and powder supplying means are usually housed in one casing, the use of a considerably long pipe 9 provided with the heater 27 makes it possible to separately arrange the hot water supplying means and the powder supplying means.

The amount of the hot water necessary for one cup of hot drink can be measured by constantly maintaining the preset pressure of the pressure adjusting device 24 and the interval when the electromagnetic valve 10 is being opened. Although the inner pressure in the tank 1 is firstly increased by the expansion of the water when the water is heated, since air in the tank is exhausted by the operation of the relief valve 23, the inner pressure becomes equal to the preset pressure of the pressure adjusting device 24 at the same time as the electromagnetic valve 10 is opened. Therefore, the amount of the hot water to be poured can be always precisely controlled.

The valve 26 attached to the upper side of the tank 1 is used for introducing air into the tank to make equal the pressure in the tank 1 to that of the atmosphere. Namely, the valve 26 is opened to introduce the air in the tank in a case where the temperature of the hot water is lowered by stopping the flow of current to the heater 4 and the inner pressure in the tank becomes negative. The cock 22 provided for the outlet end of the branch pipe 6' is used for exhausting or exchanging the hot water in the tank with fresh water as occasion demands.

Furthermore, since the electromagnetic valve 10 is closed except the time when the hot water is poured into the cup 21 and since the front end of the nozzle pipe 28 is provided with a plurality of small holes, a small amount of hot water remained in the pipe 28 does not drop from its front end after the valve 10 is closed, thus preventing the "after-dribble" of the hot water.

Figure 3:
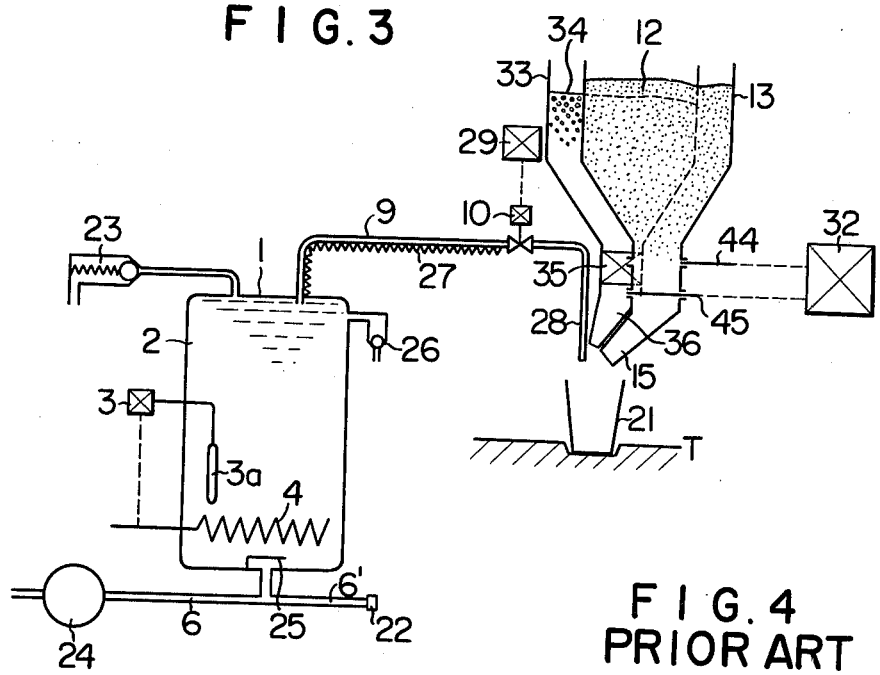
FIG. 3 is a schematic view also showing another embodiment of the apparatus according to this invention.

FIG. 3 shows another embodiment of the hot drink preparing apparatus according to this invention which is suitable for a case where it is desired to add small pieces or particles of ingredients such as dried vegetables or dried meat into the hot drink to prepare a cup of hot soup. In such a case, although it may be possible to previously mix the ingredients with the powder 12 in the hopper 13, the ingredients larger than a powder tends to be gradually gathered to the upper portion in the hopper 13 as the powder is fed many times into the powder measuring device 14 to obtain many cups of hot soup, so that it becomes impossible to prepare many cups of soup containing uniformly mixed ingredients.

In order to obviate the above defect, in the apparatus shown in FIG. 3, a hopper 33 filled with ingredients 34 is disposed near the hopper 13. A predetermined amount of the ingredients 34 is measured by an ingredient measuring device 35 connected to the bottom opening of the hopper 33 and then poured into the cup 21 through a chute 36 which is connected to the lower end opening of the device 35. The lower end of the chute 36 is positioned near the lower ends of the chute 15 and the nozzle pipe 28. The ingredient measuring device 35 is provided having substantially the same shutter mechanism as that of the device 14. Accordingly, a cup of hot soup having uniform composition can be obtained by pouring the powder and the ingredients into the cup 21 together with the hot water.

Figure 9:
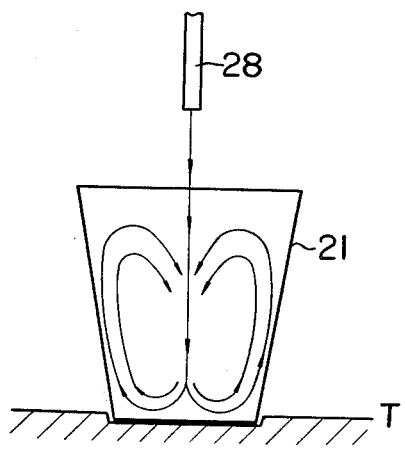
FIG. 9 is a view showing a positional relationship between a cup and a pipe through which hot water is poured and showing flow directions of the hot water when the pipe is directed to the center of the cup.

In the prior apparatus, the cup 21 is generally positioned below the pipe 28 so that the lower end thereof will be directed to the center of the opening of the cup 21 as shown in FIG. 9. The hot water poured from the pipe 28 towards the center of the cup gradually causes circular flow as shown by arrows in FIG. 9 and the powders fed together with the hot water is mixed and stirred by the circular flow so as to dissolve the powder in the hot water. However, when the hot water is poured directly towards the center of the cup, the kinetic energy of the hot water is substantially uniformly dispersed in all direction and causes only vertical circular flow which is symmetrical about the center line of the cup, thus causing no horizontal circular flow along the inside wall of the cup. Therefore, in a case where a powder, difficult to dissolve in water or a large amount of powder is to be dissolved in the hot water, the hot water including the powder would not sufficiently be stirred or non-dissolved powder would gather at the corner of the bottom of the cup 21.

Figure 10:
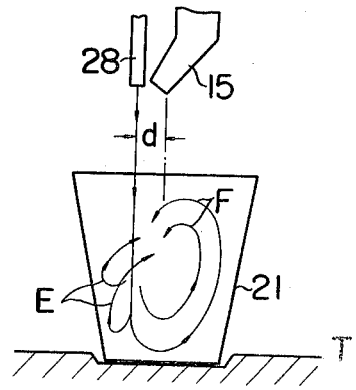
FIG. 10 is a view showing the same positional relationship as that shown in FIG. 9, but the pipe is slightly offset from the center line of the cup.

However, according to this invention, in order to completely dissolve the powder into the hot water and sufficiently stir the hot drink in the cup, a table T is provided with a recess in which a cup is put so as to slightly offset the lower end of the pipe 28 from the center line of the cup 21 by a distance d as shown in FIG. 10. The eccentric pouring of the hot water from the nozzle pipe 28 causes a main circular flow F and a sub-flow E having different flow speeds as shown in FIG. 10. The sub-flow E is likely to be influenced by the direct flow from the pipe 28 and also violently collides against the bottom and side walls of the cup thereby causing the horizontal flow along the side wall of the cup 21. This horizontal flow has a different flow speed and stires the main circular flow F, thus completely dissolving the powder into the hot water. Furthermore, the eccentric pouring of the hot water into the cup 21 enables not only to sufficiently stire the hot water containing the powder but also to entrain the powder gathered at the bottom corner of the cup into the flow.

In our experiment, it was found to be effective that the distance d is within the range 0.2–1.0 R (where R is a radius of curvature of the bottom of the cup) by taking the shape of the cup and the puring speed of the hot water into consideration.

According to this arrangement of nozzle 28 and the cup table T, it becomes possible to completely dissolve even a powder which is difficult to dissolve in the hot water, by the stirring flow of the hot water created in the cup without using any stirring member, and this arrangement is more effective to prepare a cup of hot soup by using the apparatus shown in FIG. 3.

The measuring device 14 provided with two-stage shutter mechanism according to this invention is constructed and operates as shown in FIGS. 5 through 8.

The powder measuring device 14 comprises a powder measuring cylinder 43 having a predetermined inner volume, horizontally slidable upper and lower shutters 44 and 45, a disc link mechanism 52 acting as shutter drive means, and link members 50 and 51 connecting the shutters with the link mechanism.

The powder measuring cylinder 43 is connected to the bottom opening of the hopper 13 and a chute 15 is connected to the lower end of the cylinder 43. A shaft 53 is located at substantially the middle portion between the extensions of the upper and lower shutters and extends in a direction at right angles with respect to the sliding direction of the shutters, and the shaft 53 is driven by a reversible motor, not shown. The disc link mechanism 52 is attached to the shaft 53. Although this link mechanism is not limited to disc shape, it is called a disc link mechanism 52 hereinbelow for convenience.

A link member 50 is pivotably connected at one end to the end of the upper shutter 44 and at the other end to a point A on the periphery of the disc link mechanism 52. A link member 51 is also pivotably attached at one end to the end of the lower shutter 45 and at the other end to a point B on the periphery of the disk link mechanism 52. Further, an angle <AOB is predetermined within a range of $180° > <AOB > 90°$, where O represents the axis of the shaft 53.

Figure 5:
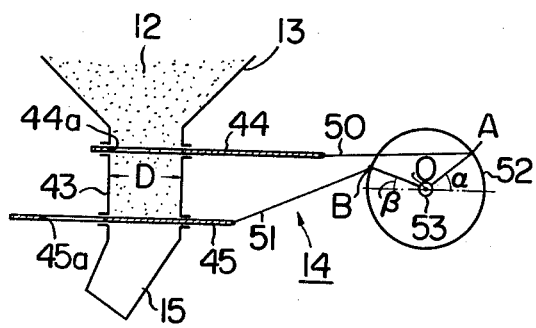
FIGS. 5 through 7 are schematic sectional views showing a powder measuring device having an improved two-stage shutter mechanism according to this invention, at different stages of operation.

FIG. 5 shows a state wherein the powder 12 fills the measuring cylinder 43, and the lower shutter closes the lower end opening of the cylinder 43 and wherein the opening 44a having a diameter D of the upper shutter 44 is alined with the upper end opening having a diameter D of the cylinder 43. The opening 45a of the lower shutter 45 is now offset leftwardly from the lower end opening of the cylinder. Under this condition, it is desired that the point A forms an angle $\alpha$, preferably about 45°, in the first quadrant of X–Y coordinates and the point B forms angles $\beta$, preferably $\beta < 30°$, in the second quadrant thereof.

Figure 6:
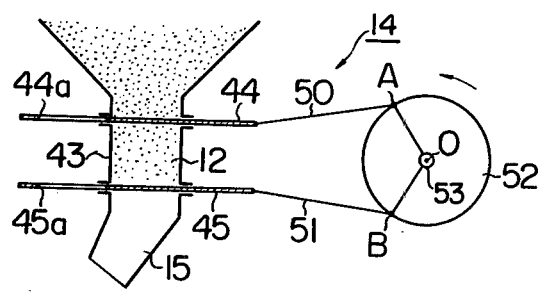
Figure 7:
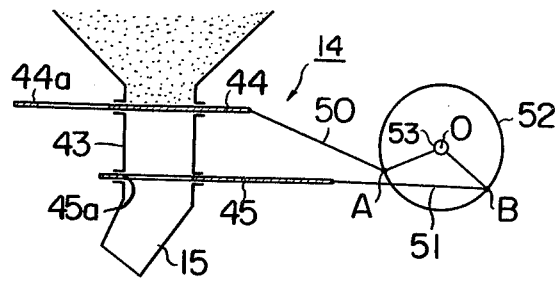

As the link mechanism 52 rotates anti-clockwisely from the state shown in FIG. 5, the upper shutter 44 moves leftwardly so as to close the upper end opening of the measuring cylinder 43 and the lower shutter 45 is reciprocated, but the lower end of the measuing cylinder is still maintained in the closed state. FIG. 6 shows the condition in which the both shutters completely close the upper and lower end openings of the cylinder 43, at this time, the amount of the powder in the cylinder 43 is equal to that required to prepare one cup of hot drink. When the disc link mechanism 52 further rotates anti-clockwisely, the upper shutter 44 moves leftwardly while maintaining the upper end opening of the measuring cylinder 43 to the closed state. Then, the lower shutter 45 is moved rightwardly and the opening 45a is gradually aligned with the lower end opening of the cylinder to assume the completely aligned position as shown in FIG. 7. Thus, a predetermined amount of the powder 12 in the cylinder 43 drops through the chute 15.

In a case where it is required to measure a predetermined amount of powder for preparing next one cup of hot drink, the link mechanism is clockwisely rotated to return the shutters to their original positions shown in FIG. 5 from the positions shown in FIG. 7 and then, the measuring cylinder 43 is again filled with the powder 12.

Figure 8:
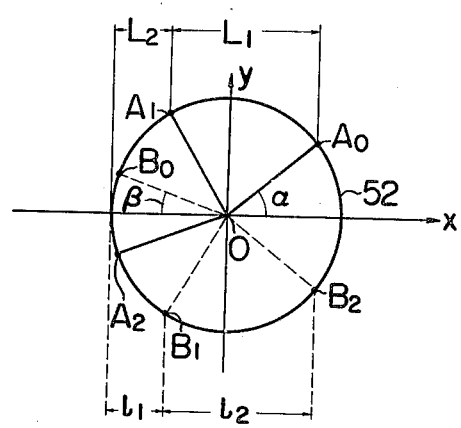
FIG. 8 shows movements of the points A and B, on the shutter driving mechanism, to which link members for moving the shutters are attached.

FIG. 8 shows the movements of the points A and B on the periphery of the disc link mechanism 52 in accordance with the rotation thereof. As the link mechanism 52 rotates anti-clockwisely, the point A moves from the original point $A_0$ to the final point $A_2$ through an intermediate point $A_1$, and the point B moves from the point $B_0$ to the point $B_2$ through an intermediate point $B_1$.

Now, when the link mechanism 52 rotates anti-clockwisely by one half of a predetermined angle, about 180°, the point A moves from $A_0$ to $A_1$, and the point B also moves from $B_0$ to $B_1$, the horizontal displacements of the point A and B being $L_1$ and $l_1$, respectively. Next, when the disc link mechanism 52 further rotates by one half of the predetermined angle, the point $A_1$ reaches the point $A_2$ and the point $B_1$ reaches the point $B_2$, the horizontal displacements of the points A and B now being $L_2$ and $l_2$, respectively. As is understood from FIG. 8, $L_1$ is considerably larger than $L_2$ and $l_1$ is considerably smaller then $l_2$.

Figure 4:
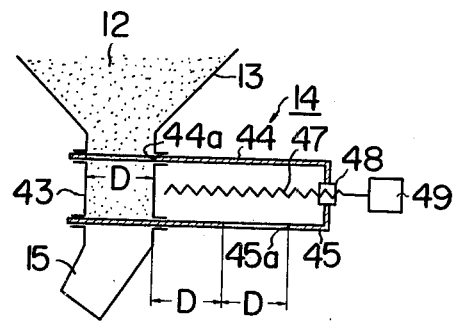
FIG. 4 is a schematic sectional view showing a conventional powder measuring device having a two-stage shutter mechanism used for the hot drink preparing apparatus.

In a powder measuring device provided with a conventional two-stage shutter mechanism shown in FIG. 4, two separate drive sources were required for operating upper and lower shutters, respectively, or even if one drive source was applied, it was required to switch the drive source every time when one of the shutters is operated. However, according to the powder measuring device of this invention, it is not necessary to use two independent drive sources and to switch the sources, so that the device and the operation thereof are not complicated in comparison with the conventional device.

As is understood from the foregoing descriptions, the point A has to move from the point $A_0$ to the point $A_2$ through the point $A_1$ for closing and opening the upper shutter 44, the horizontal displacement being $L_1+L_2$, and the point B has to move from the point $B_0$ to the point $B_2$ through the point $B_1$ for closing and opening the lower shutter 45, the horizontal displacement being $l_1+l_2$. However, as is apparent from FIG. 8, the displacement $L_1$ or $l_2$ is substantially equal to or slightly larger than the diameter D of the opening of the shutter, but the displacement $L_2$ or $l_1$ is considerably smaller than the diameter D.

Therefore, the sliding length of the shutter is equal to $L_1+L_2$ or $l_1+l_2$, which is smaller than 2D required for the shutter of the conventional measuring device shown in FIG. 4, and the total length of the shutter of this invention is of cource smaller than that of the conventional device. Thus, the space occupied by the powder measuring device according to this invention is smaller than that of the conventional one.

Furthermore, according to the powder measuring device of this invention in which one disc link mechanism 52 and two link members 50 and 51 are interconnected, there is little fear of drawing the powder into the shutter mechanism which leads to the stoppage of the operation of the shutters.

In addition, since the shutters are always moving during the measuring operation of the device 14, the sliding resistance of the shutter is determined by the kinetic friction coefficient which is smaller than the static friction coefficient, and therefore, the shutters can move smoothly and speedily, so that shock or vibration of the shutter or device 14 due to the sliding resistance is hardly generated in the apparatus different from the conventional apparatus.

In the other example of the shutter driving mechanism, an arm or a polygonal plate or the like may be used, but the mechanism is of course required to be rotatable and have the positional relationship regarding the points A and B of the link members.

Furthermore, in order to manually operate the link mechanism, it may comprise a disc-shaped link member, a small pulley coaxially secured to the link member, a large pulley operatively connected to the small pulley through a belt, and a lever attached to the large pulley and adapted to be manually operated. When the large pulley is rotated manually by rotating the lever by a small angle, the small pulley, i.e. the link member, is rotated reversely by an angle within about 180°.

What is claimed is:

1. Apparatus for preparing a cup of hot drink comprising a tank for storing hot water, said tank being provided with means for constantly controlling temperature of the hot water contained therein and means for constantly controlling pressure of said hot water; a pipe having one end communicating with said tank for feeding said hot water from said tank; a nozzle connected to said pipe through valve means; a timer connected to said valve means for controlling the operation thereof; a hopper filled with a raw material for preparing said hot drink; powder measuring means connected to the bottom opening of said hopper; a chute connected to the bottom end of said powder measuring means, the outlet opening of said chute being arranged near the outlet of said nozzle; and means for supporting a cup for preparing hot drink beneath said outlet opening of said chute and said outlet opening of said nozzle, said powder measuring means comprising a powder measuring cylinder, upper and lower end openings of which are aligned with the lower end opening of said hopper and upper end opening of said chute, respectively, upper and lower shutters operated for alternately closing and opening said upper and lower end openings of said cylinder, and a rotary disc for driving said shutters through link members, one end thereof being pivotably connected to said shutters respectively and the other end thereof being connected to circumferentially spaced apart points of said disc.

2. The apparatus according to claim 1 wherein said hot water supplying means further comprises valve means on the side wall of said tank to supply air therein when the inner pressure in said tank becomes negative.

3. The apparatus according to claim 1 wherein said hot water feeding pipe is provided with a heater therearound.

4. The apparatus according to claim 1 wherein said link mechanism comprises a disc-shaped link mechanism and a reversible motor to drive the same.

5. The apparatus according to claim 1 wherein said means for supporting a cup comprises a table provided with a recess in which a cup is put in the manner that the front end of said nozzle is slightly offset from the center line of the opening of the cup.

6. The apparatus according to claim 1 wherein said powder supplying means comprises a plurality of hoppers containing different ingredients, chutes and measuring devices respectively connected between said hoppers and said chutes the outlet openings of said chutes being disposed near the lower end of said nozzle.

* * * * *